United States Patent [19]
Chromie

[11] 4,103,151
[45] Jul. 25, 1978

[54] SOLAR TRACKING SYSTEM

[76] Inventor: Edsel Chromie, 6720 Belle Glade, San Diego, Calif. 92119

[21] Appl. No.: 812,526

[22] Filed: Jul. 5, 1977

Related U.S. Application Data

[62] Division of Ser. No. 735,593, Oct. 26, 1976.

[51] Int. Cl.$^2$ .............................................. G01J 1/20
[52] U.S. Cl. ................... 250/203 R; 126/271
[58] Field of Search ................. 250/203 R, 204; 126/270, 271

[56] References Cited

U.S. PATENT DOCUMENTS

| | | | |
|---|---|---|---|
| 2,155,402 | 4/1939 | Clark | 250/203 R |
| 3,070,699 | 12/1962 | Lehmann et al. | 250/203 R |
| 3,996,460 | 12/1976 | Smith | 250/203 R |
| 3,996,917 | 12/1976 | Tribey | 126/270 |

*Primary Examiner*—David C. Nelms
*Attorney, Agent, or Firm*—Frank D. Gilliam

[57] ABSTRACT

A solar powered engine and tracking system comprises a piston working within a cylinder for turning a drive shaft for driving an electrical generator or performing other useful work, a solar concentrator comprising a plurality of mirrors, each reflecting Sun light on a common focal point on the end of the cylinder for heating a flash boiler located thereon, preheated water from a source is injected into the flash boiler by a pump powered by the drive shaft timed according to piston movement after operating the piston, the steam is then vented from the boiler by valve means operated from the drive shaft. A starter motor is provided to initially start the engine operating by rotating the drive shaft until the piston movement is self sustaining. The entire device is enclosed in a solar energy collector panel for elevating the temperature of the system so as to maintain the water at a sufficient temperature with a minimum of external heating. The collector may also be utilized for separate external heating purposes. Sensor controlled motors track the relative movement of the Sun and Earth and continually position the collector for maximum solar energy concentration.

2 Claims, 6 Drawing Figures

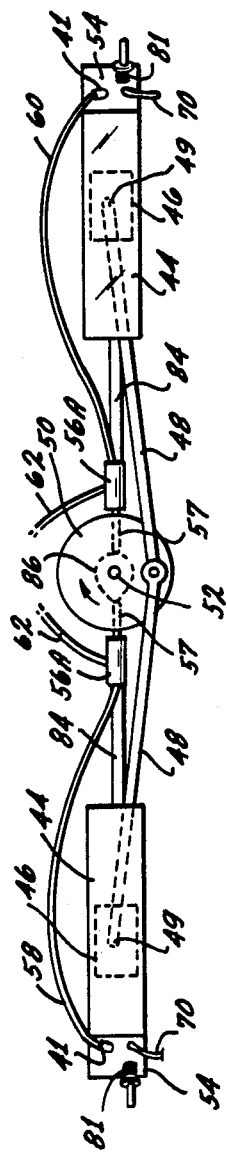
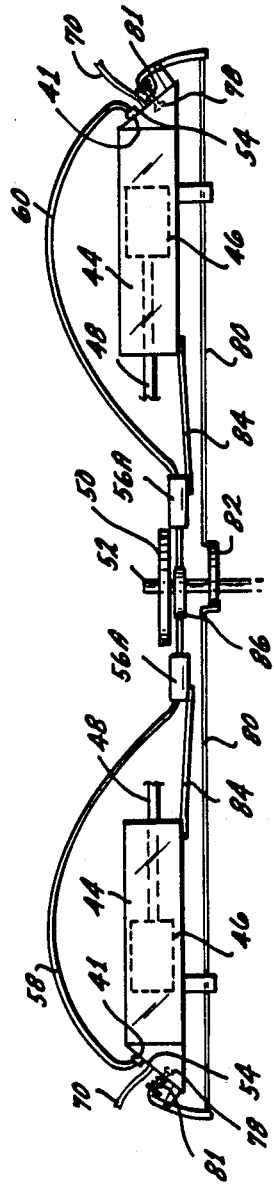

SOLAR TRACKING SYSTEM

This is a division of application Ser. No. 735,593, filed 10/26/76.

BACKGROUND OF THE INVENTION

The present invention relates to steam engines and more specifically to a flash boiler operated steam engine where the principal heat is supplied by a solar concentrator confined within a solar energy collector.

There are several prior art devices that utilize solar heat to operate steam engine devices.

U.S. Pat. No. 1,424,932 teaches the use of a steam engine boiler positioned at the apex of a parabolic reflector system. This system teaches the forming of a parabolic surface and a plurality of different focal points around the surface of the steam boiler.

There is no means provided for positioning of the device to ensure maximum heat from the Sun during Sun/-Earth relative movement.

U.S. Pat. No. 1,386,781 teaches a solar concentrator device where Sun tracking is performed by a clock motor mechanism.

U.S. Pat. No. 3,892,433 teaches a plurality of curved reflectors positioned to direct solar energy to a plurality of focal points on a steam generator. The positioning of the reflectors requires an equal plurality of optical sensors and sensor-servo mechanisms.

These prior art systems are complicated, inefficient and economically expensive to produce.

SUMMARY OF THE INVENTION

The present invention provides an efficient, uncomplicated and reasonably inexpensive means for converting solar light energy into useful work. The Sun's light rays are concentrated at a single focal point on a flash steam boiler to maximize the heat at the boiler. The operating mechanism is enclosed in a solar heat collector panel so as to elevate the temperature of the entire system to provide increased operational efficiency. The collector tracks the relative movement of the Sun and Earth by sensor controlled motor means so as to maintain the maximum heat at the flash steam boiler during Sun light hours.

The main object of this invention is to utilize the heat energy of the Sun's rays in the production of electrical power.

Another object of this invention is to devise an apparatus of extremely high efficiency which will obtain the maximum result from the Sun's rays for the maximum time period.

A further object of the invention is to provide a solar energy concentrator occupying a minimum of vertical space.

The foregoing objects, features, advantages and results of the present invention, together with various other objects, advantages, features and results thereof which will be evident to those skilled in the solar energy art in the light of the disclosure, may be achieved with the exemplary embodiment of the invention illustrated in detail hereinafter.

DESCRIPTION OF THE DRAWINGS

FIG. 5 is a plan view, partially in phantom, of the injector pumps and their operating mechanism; and FIG. 6 is a side view of the FIG. 5 showing further including the valves and their operating mechanism.

DESCRIPTION OF THE PREFERRED EMBODIMENT

Figure 1:
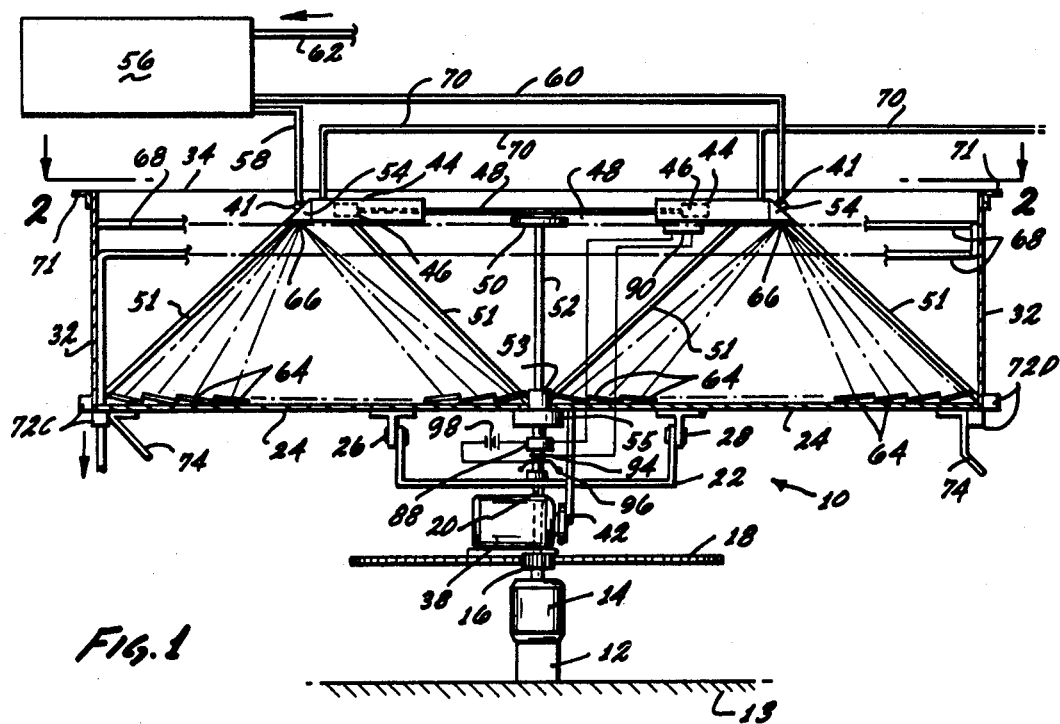
FIG. 1 is a partially cutaway side view of the apparatus of the invention.

The same reference numerals are used throughout the Figures and specifications to depict the same element or part.

Figure 2:
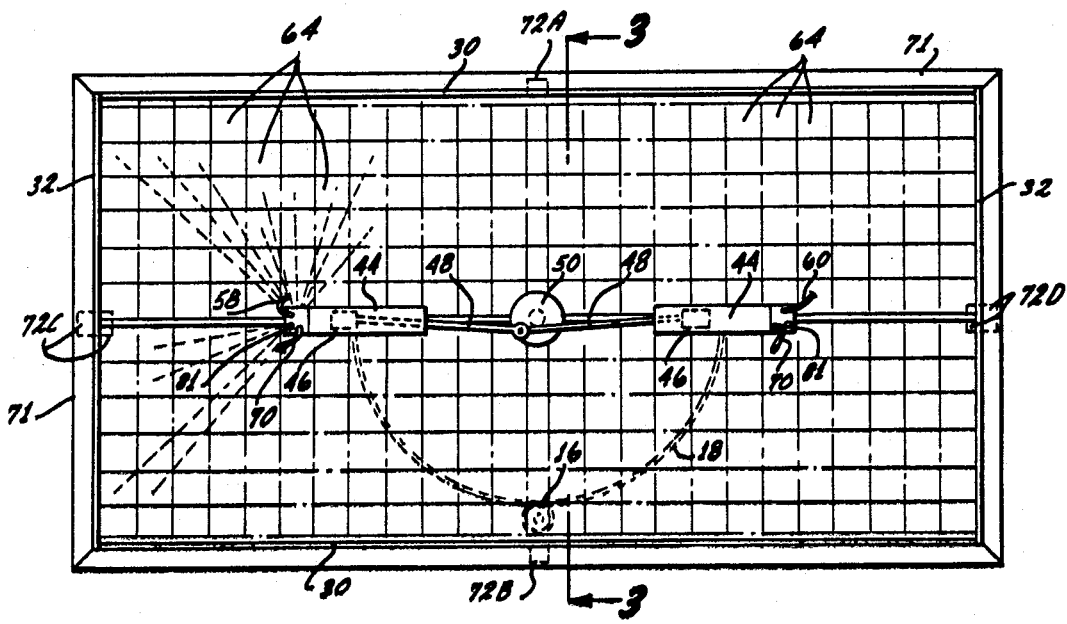
FIG. 2 is a plan view of the reflective surface of the solar concentrator of the invention.
Figure 3:
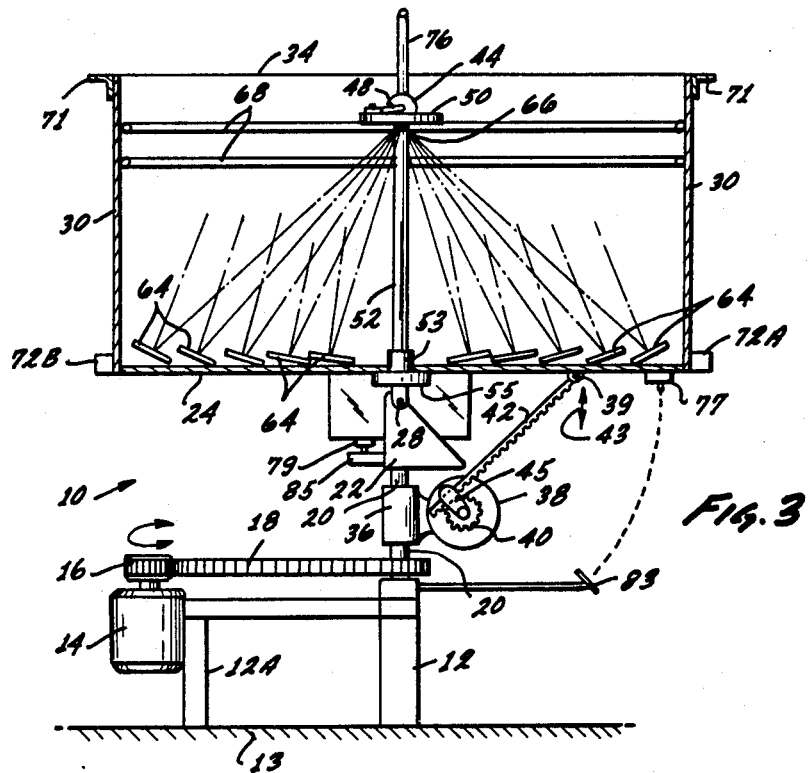
FIG. 3 is a partially cutaway end view of the apparatus of the invention taken along lines 3—3 of FIG. 2.

Referring now specifically to FIGS. 1, 2 and 3, a combination solar light energy collector and concentrator 10 is shown. The apparatus is supported by a base 12, 12a attached to a surface positioned on the Earth 13, an example would be a support member buried in the ground to a sufficient depth and having sufficient mass to easily support the apparatus 10. The base 12a supports a motor 14 which drives a gear 16 attached to the motor shaft. Gear 16 drives a larger semi-circular gear 18. The gear 18 is fixedly attached to shaft 20 which is fixedly attached to the collector bracketry 22. Shaft 20 is rotatably attached to the base member 12 thus allowing the base free rotational movement relative thereto.

Pivotly attached to bracketry 22 is the collector bottom member 24. The bottom member 24 is allowed to pivot with respect to base member 12, 12a at its pivotal attachment points 26, 28. The collector further includes side members 30 and end members 32. The lid 34 of the collector is constructed of a light admitting material, such as, but not limited to, glass or plexi-glass. The lid, sides, ends and bottom make up an enclosure for the collection of solar energy. Insulation (not shown) is used to contain the heat within the collector.

A bracket 36 fixedly secured to shaft 20 supports a second motor 38. The rotation of motor 38 drives a gear 40. A gear rack 42 is pivotly attached at its upper end 39 to the collector bottom 24. The opposite end of the rack 42 is held in sliding engagement by bracket 45 which is free to pivot with respect to gear 40 and allows rack 42 to freely move therein when the gear 40 is caused to rotate. It can be readily seen that when the motor rotates, the rack will translate causing the collector to tilt downwardly from its FIG. 1 and 3 position. Along arrow 43 within the limits of the length of the gear rack 42.

Positioned within the upper portion of the collector are two cylinders 44 which contain pistons 46 slidably engaged therein. The pistons are each connected to a connecting rod 48 by a conventional piston pin 49 (see FIG. 5) so that the connecting rod is free to move laterally with respect to the longitudinal movement of the piston. The ends of the connecting rods remote from their piston attached ends are pivotly connected to a central disk 50 (see the various figures). The disk 50, in some instances, will be required to have sufficient mass to act in the manner of a fly wheel.

It can be readily seen that as the pistons move within their respective cylinders, the disk 50 will rotate.

The disk 50 is secured to the end of a drive shaft 52 which passes through a slip guide 53 and is attached to a generator 55 for the production of electricity as the pistons move. It should be understood that drive shaft 52 may be utilized to perform any type of useful work and is not limited to the production of electricity.

The cylinders are supported by the lower surface 24 by any convenient manner so as to block as little of the Sun's rays striking the reflective surfaces as practical. Brackets 51 are an example of how this may be accomplished.

The generator 55 is secured either to the bracketry 22, the bottom 24 of the collector or through a supporting bearing on shaft 52, so that it can tilt or turn with the collector panel when motors 38 and 14 are energized.

At one end of cylinders 44 is positioned flash steam boiler 54. A pump 56 for pumping the pre-heated water or any suitable expandable fluid through the injectors 41 (shown in one variation) is interconnected to each of the two flash steam boilers through high pressure conduit 58, 60. The inlet to the pump 56 is connected to a source of preheated water through conduit 62. The output of the pump supplies water under increased pressure to a conventional injector 41, such as those used in the diesel engine art, which injects this water into the flash steam boiler 54.

A plurality of flat recti-linear reflective surfaces 64 are supported by and cover the inner surface of bottom 24. The reflective surfaces are positioned and held in place so that each will reflect the light of the Sun shining thereon to a single focal point 66 on the lower surface of the flash steam boiler 54. It should be noted that the reflective surfaces shown are of sufficient area quantity to be equally divided between two focal points to operate two flash steam boilers 54.

The reflective surface may be glass mirrors, however, the invention is not limited in this manner as any suitable reflective surface may be utilized equally as well to practice the invention.

The source of preheated water supplied to pump 56 may be from any external heating means (not shown), a coil of conduit 68 (continuing from conduit 70) and being preheated by the temperature built up within the collector or a combination of collectors and external heat. It should be noted that the water that is preheated by the collector may be utilized for any additional purposes desired. The conduit 70 may lead from the apparatus for additional heating of a house, etc., or operating refrigeration apparatus or the like before returning to the coils within the collector.

Figure 4:
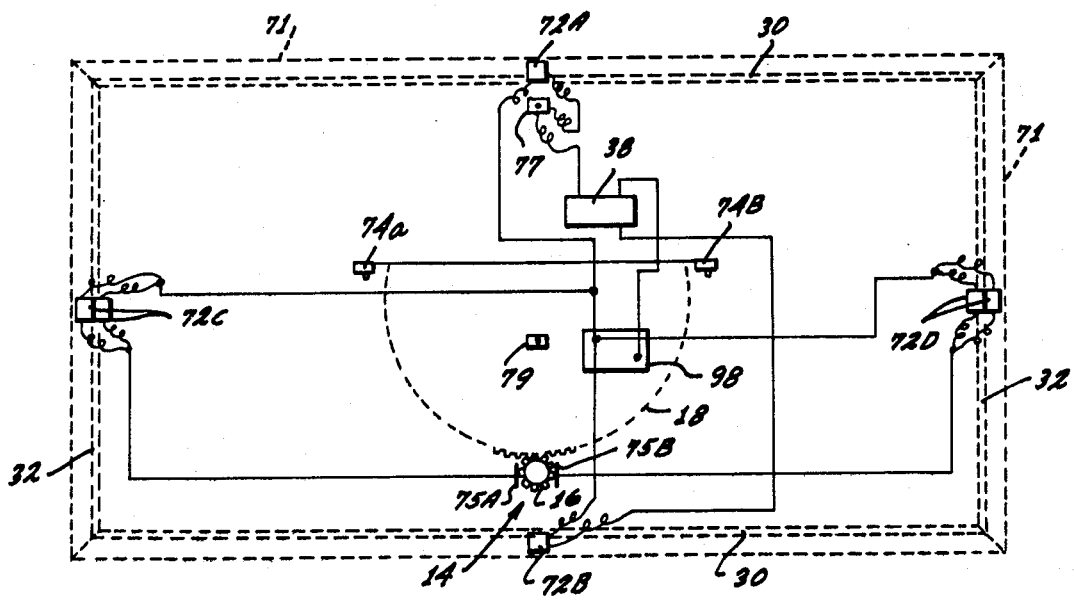
FIG. 4 is a diagrammatic view of the electrical wiring of the solar tracking mechanism of the invention.

Referring now to FIGS. 1–4, on each side 30, external of the collector, are positioned light sensing elements 71a, 72b, on each end 32 are positioned a pair of senors 72c and 72d, in some applications a pair of sensors 72c and 72d may be required (see FIG. 4). These sensors may take many forms, such as, but not limited to, selenium photo cells, catalog number 276-115 and light activated silicon controlled rectifiers, catalog number 276-1095, both are manufactured by Archer for Radio Shack Inc., or the like. Referring now specifically to FIG. 1, a shield 74 is positioned adjacent to the sensors 72c and 72d preventing direct Sun light from the opposite side of the collector from striking their light sensitive surface. A pertusion or lip 71 is positioned around the upper surface of the collector panel for shielding the various sensors 72a, 72b, 72c and 72d which are adjacent thereto. The pertusion or lip has sufficient width to aid in shielding the Sun's light rays from its adjacent sensor when the collector is properly positioned with respect to reflecting the Sun's light rays from reflectors 64 to focal point 66.

The sensors 72c, 72d are interconnected to motor 14 so that when light strikes the sensors, the motor will be activated in a rotational direction to turn the collector until the light no longer strikes that sensor. The sensors 72a and 72b are positioned so that when they receive light rays from the Sun, they cause motor 38 to operate and tilt the collector until that sensor no longer receives the light rays.

Both motors operate in either rotational direction depending upon their requirement and hold their last activated position. The motors are either very slow rotating, such as a clock motor, or are connected to a speed step down gear box (not shown) to reduce their speed to that suitable for the above requirement.

A pair of normally closed switches 77, 79 are wired in series with sensors 72a, 72b respectively, which are in series with motor 38 and battery 98. The sensors have separate series circuits. Switch 77 is depressed when the bottom 24 is rotated to its maximum downward position causing the switch to engage bracket 83 attached to base 12. When contact is made, switch 77 opens the series circuit between sensor 72a and the motor causing the motor to be inoperative. When the bottom 24 is in its FIG. 1 and 3 position, switch 79 engages bracket 85 and causes motor 38 to be inoperative in the opposite direction. This is a safety feature to prevent burn out of the motor. A similar pair of series circuits are provided with switches 74a and 74b that engage brackets 75a and 75b respectively to serve the same purpose as switch 77, 79 for apparatus rotating motor 14.

It should be obvious that when conduit 70 is connected external of the collector that a flexible conduit must be attached to its end to allow freedom of rotational and tilting movement with the collector as required. When the conduit 70 returns the water to the system, it can be attached by flexible conduit means through conduit 76 (see FIG. 3) adjacent a portion of the drive shaft 52.

Referring now specifically to FIGS. 5 and 6, the valves 78 are actuated by the operation of their associated push rods 80. Push rods 80 bear against cam lobe 82 secured to drive shaft 52 for rotation therewith. Springs 81 return the valves to a normally closed position. The valves 78 are operable in a conventional manner to open at the required time so as to vent each flash steam boiler 54 when its associated piston reaches the end of its power stroke. The first showing of pump 56 was a block showing of a single conventional device well known in the diesel engine art or the like. Separate single pumps 56a are shown in FIGS. 5 and 6 as another example of a pump system that may be utilized equally as well to practice the invention. The two pumps 56a as 56 may be supported by the cylinder through bracket 84 as an example, however, support means from the bottom 24 (not shown) may be utilized equally as well to practice the invention. The pumps 56a are actuated by means of cam 86 operating push rods 57. The pump actuators are internally biased to bear against the cam 86 at all times.

Referring now specifically to FIG. 1, in some circumstances a starter systems will be required to initially turn shaft 52 so as to provide rotation of cam 86 to actuate the pumps 56a. The starter system includes a starter motor 88 having its rotor co-axial and attached with drive shaft 52. Actuation of the starter motor will turn shaft 52 at sufficient speed to properly actuate the pumps 56a.

The circuit for the starter motor includes a temperature sensitive switch 90 positioned perferrably adjacent one of the flash steam boilers and a second switch comprising an electrical conductive slip ring 94 positioned above a centrifical fly weight 96 which is attached to the drive shaft 52. When drive shaft 52 turns the fly weight 96 at sufficient speed, it is caused to move away from slip ring 94 which in turn opens the starter motor circuit. Switch 90 and slip ring switch 94 are wired in series with the starter 88 and the battery 98 so that both are required to close to enable the starter motor to operate. Therefore, the starter motor will run only when the engine operation does not rotate shaft 52 at a speed that opens slip ring switch 94 and the temperature is sufficient to close switch 90. If either do not occur, in the absence of the Sun, the starter motor will remain inoperative. The power to operate the starter motor is supplied, for example, by battery 98. It should be understood that in some instances, it will be advantageous to combine the starter motor and generator into a single device in a known manner.

It should be understood that although two steam engine piston and cylinder combinations are shown and discussed, that a single piston and cylinder steam engine or more than two piston and cylinder combinations may be connected to the same drive shaft 52 depending on power requirements and space available. Each steam engine would require a separate concentrator.

OPERATION OF THE PREFERRED EMBODIMENT

The apparatus, as described, is positioned with its side 30 having motor 38 in a generally southernly direction and ends 32 in an east/west direction.

With the apparatus properly positioned with respect to the Sun, the rays will be reflected by each of the mirror segments 64 to their appropriate focal point 66 on the bottom surface of the flash steam boiler 54.

Assume that at a given time the Sun has not been visible for a period of time, and now reappears, the temperature of the collector is reduced below a predetermined level and the Sun's rays will not be directed to focal point 66 because of relative movement between the Sun and Earth. The Sun's light rays will strike sensors 72a, 72b, 72c, and 72d that are exposed to direct Sun light, activating the motors 38 and 14 to position the panel to focus on focal point 66.

In the afternoon, the sensors on the North and West would likely be exposed and in the morning, likely the South and East sensors would be exposed. The sensor or sensors receiving the Sun's light rays will cause their associated motor to operate sensors 72a and 72b in a rotational direction in which that sensor is directed away from direct contact with the Sun's rays and sensor 72c will cause counterclockwise rotation while 72d will cause clockwise rotation of motor 14. When the sensor is shielded from the Sun's rays, then its associated motor will stop and maintain its last rotational position. If a second sensor 72 has been activated, a similar operation will occur. When both of the motors are stopped, then the rays of the Sun will again be directed from the reflectors to the focal point 66 on the bottom surface of the flash steam boiler 54.

When the flash steam boiler 54 reaches a predetermined temperature that is sufficient to maintain piston displacement and drive shaft rotation switch 90 will energize the starter motor 88. The speed of rotation of the starter motor is sufficient to cause the pistons to translate at an operable speed taking in consideration the load of the generator, pumps, and valves, but not sufficient to turn the fly weight 96 fast enough to disengage slip ring 94. When the normal operation of the device increases the speed of the pistons and drive shaft, the fly weight 96 will then rise and disengage the slip ring 94 and the starter motor circuit will then be de-energized.

As relative movement between the Sun and Earth is detected by the Sun's rays again striking the sensor or sensors, the positioning motors will be activated to reposition the collector so that the reflective surface will maintain their same focal point on the lower surface 66 to provide maximum heat collection.

As is well known for servo-systems, some hunting between the motors directional rotation may occur but a slightly enlarged focal surface will allow the reflection to be positioned on the lower surface during normal hunting of the positioning system.

The positioning of the collector will continue to occur as long as Sun light is present. Absence of Sun light will cause the positioning to stop. When the Sun light is again present, a similar sequence of events will occur bringing the positioning apparatus into operation.

When the flash boiler temperature is such that the pistons will cease to operate the switch 90 circuit is open preventing operation of the starter circuit as with the positioning apparatus, return of Sun light will provide a proper sequence of events bringing the engine into operation.

The invention may be embodied in other specific forms without departing from the spirit or essential characteristics thereof. The present embodiment is, therefore, to be considered in all aspects as illustrative and not restricting, the scope of the invention being indicated by the appended claims rather than by the foregoing description, and all changes which come within the meaning and range of equivalency of the claims are therefore intended to be embraced therein.

What is claimed as new and useful and desired to be secured by U.S. Letters Patent is:

1. A system for tracking the relative movement of the sun and earth comprising:
    a base member;
    a positionable platform carried by said base member;
    a plurality of light sensors, each light sensor providing a control signal when exposed to the direct rays of the sun, said sensors being positioned in a spaced apart relationship about the periphery of said positionable platform providing a first and second pair of diagonally opposed light sensors;
    shielding means positioned adjacent each of said plurality of light sensors for preventing the direct rays of the sun from striking more than one light sensor of each pair of light sensors at any given time;
    a first positioning means responsive to said control signals from said first pair of light sensors for providing directional rotation of said positionable platform with respect to said base member along a first path of travel between physical restraints; and
    a second positioning means responsive to the control signals from said second pair of light sensors for providing directional rotation of said positionable platform with respect to said base member along a second path of travel between the physical restraints;
    said first and second positioning means include control signal interruption means for stopping the movement of said positionable platform along said first and second paths of travel prior to reaching said physical restraints.

2. The invention as defined in claim 1, wherein said positioning means comprises two motors interconnected to said positionable platform for moving said platform along its first and second paths of travel, the rotational direction of each of said motors being determined by the control signal from its light sensor exposed to the direct rays of the sun.

* * * * *